United States Patent [19]

Niimura et al.

[11] Patent Number: 4,549,104
[45] Date of Patent: Oct. 22, 1985

[54] MOTOR OF THE PERMANENT-MAGNET ROTOR TYPE

[75] Inventors: Yoshihisa Niimura, Tokyo; Shin Shimamura, Kawaguchi, both of Japan

[73] Assignee: Sanyo Denki Co., Ltd., Tokyo, Japan

[21] Appl. No.: 558,203

[22] Filed: Dec. 5, 1983

[30] Foreign Application Priority Data

Dec. 7, 1982 [JP] Japan ............... 57-185216[U]

[51] Int. Cl.$^4$ ............................................. H02K 29/02
[52] U.S. Cl. ................................. 310/67 R; 310/156
[58] Field of Search .................... 310/156, 67, 186

[56] References Cited

U.S. PATENT DOCUMENTS 3,274,412 9/1966 Fisher ................................ 310/186
3,873,897 3/1975 Muller .
3,873,898 3/1975 Muller .
4,357,563 11/1982 Ohno .
4,433,472 2/1984 Andoh et al. .................. 310/186 X
4,439,703 3/1984 Kohzai et al. .................... 310/186

FOREIGN PATENT DOCUMENTS 2346380 11/1974 Fed. Rep. of Germany .

Primary Examiner—Donovan F. Duggan
Attorney, Agent, or Firm—Pearne, Gordon, Sessions, McCoy, Granger & Tilberry

[57] ABSTRACT

A motor of the permanent magnet rotor type is disclosed which is capable of permitting the rotor to be constantly stopped at a position of allowing the rotor to be started without employing any specific magnet arrangement. The motor is constructed in a manner such that a gap $G_1$ between the pole face of each of main poles of a stator and each of magnetic poles of the rotor is formed to gradually increase in width, and a gap $G_2$ between the pole face of each of complementary poles of the stator and each of the magnetic poles is formed to have the substantially same width as the maximum width of the gap $G_1$.

12 Claims, 4 Drawing Figures

MOTOR OF THE PERMANENT-MAGNET ROTOR TYPE

BACKGROUND OF THE INVENTION

1. Field of the Invention

This invention relates to a motor of the permanent-magnetic rotor type, and more particularly to a small-sized motor having a rotor equipped with permanent magnets.

2. Description of the Prior Art

A conventional brushless motor which has been called a hall motor or a transistor motor in the art falls under the category of such a motor of the permanent-magnet rotor type as mentioned above.

Such a motor includes a stator having a plurality of main poles arranged so as to be spaced from each other in the circumferential direction thereof and each having a field winding mounted thereon, and a plurality of complementary poles each arranged between the adjacent two main poles so as to be spaced at an interval from the main poles. The motor also includes a rotor, which has a plurality of magnets and is adapted to be stopped at a position of allowing the magnetic reluctance of a gap defined between the stator and the rotor to be balanced. However, the rotor is often stopped at a position of causing the rotor attractive force to the rotor to overcome the circumferential force or torque thereof. The stopping of the rotor at such position causes a problem of rendering the restart of the rotor difficult or substantially impossible.

In order to eliminate such disadvantage, the conventional motor of such type is provided with a construction which allows the rotor to be always started.

More particularly, for example, in one of the conventional motors of the type that a rotor is adapted to be rotated at the inside of a stator, the rotor is constructed to have regions magnetized to allow the north and south poles to alternately appear on the outer periphery of the rotor and unmagnetized regions alternately arranged in turn in the circumferential direction of the rotor. Due to such unmagnetized regions, the rotor is adapted to permit the torque to overcome the attractive force.

Whereas, in one of the conventional motors of the type that a rotor is rotated at the outside of a stator, the rotor is integrally formed by laying a first magnet group consisting of cylindrically arranged magnets corresponding in number to main poles of the stator and a second magnet group consisting of cylindrically arranged magnets twice as many as the main poles on one another, and the first and second magnet groups are joined to each other in a manner such that a half of the joint surface of each of the magnets forming the second magnet group coincides with the joint surface of each magnet of the first magnet group; so that the distribution of torque generated by the second magnet group while the rotor is stopped may have harmonics twice that generated by the second magnet group. The combined torque is adapted to overcome the attractive force as in the rotor having the unmagnetized regions in the aforesaid motor. More particularly, the torque is adapted to constantly overcome the attractive force at the start due to the second magnet group, resulting in the starting torque being generated.

Nevertheless, such conventional motors as described above still have the following defects. The former construction in which the rotor is formed with the unmagnetized regions has a disadvantage of decreasing in operating efficiency of a small-sized motor due to the decrease in utilization of the magnets as compared with a motor which does not have such an unmagnetized region. In the latter construction, it is required to combine the first and second magnet groups to form the rotor and align the joint surface of each magnet of the former magnet group with that of the corresponding magnet of the latter magnet group, resulting in the manufacturing process being complicated to thereby increase the manufacturing cost of a small-sized motor.

BRIEF SUMMARY OF THE INVENTION

The present invention has been made in view of the foregoing disadvantages of the prior art.

Accordingly, it is an object of the present invention to proivde a motor of the permanent-magnet rotor type wherein the rotator is capable of being simply constructed only by arranging magnetic poles in the circumferential direction of the rotor in a manner to allow the north poles (hereinafter referred to as "N poles") and the south poles (hereinafter referred to as "S poles ") to alternately appear in turn without employing any specific magnet arrangement.

It is another object of the present invention to provide a motor of the permanent-magnet rotor type which is capable of always stopping the rotor at a position at which the rotor is capable of being started.

It is a further object of the present invention to provide a motor of the permanent-magnet rotor type which is capable of being effectively and smoothly started and with a simple construction.

In accordance with the present invention, there is provided a motor of the permanent-magnet rotor type comprising a stator having a plurality of main poles and a plurality of complementary poles integrally formed thereon, said main poles being arranged to be spaced from each other in the circumferential direction of said rotor and each having a field winding provided thereon, said complementary poles being arranged between the respective adjacent two main poles in a manner to be spaced from said main poles; said plurality of complementary poles being magnetized when an exciting current flows through said field windings of said main poles to allow said main poles to be magnetized; a permanent-magnet rotor having a plurality of magnetic poles annularly arranged opposite to the pole faces of said main and complementary poles, said rotor being arranged concentric with said stator; said plurality of magnetic poles being combined with each other in turn and magnetized to allow N and S poles to alternately appear in turn; wherein a gap $G_1$ between the pole face of each of said main poles and each of said magnetic poles of said rotator is defined to gradually increase in width; and a gap $G_2$ between the pole face of each of said complementary poles and each of said permanent magnets is defined to have substantially the same width as the maximum width of said gap $G_1$.

In the preferred embodiment of the present invention, said gap $G_1$ comprises a uniform gap region of a uniform width and a non uniform gap region extending from said uniform gap region and having a width or interval gradually increased from that of said uniform gap region.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference characters are intended to designate like or corresponding parts throughout, wherein.

DETAILED DESCRIPTION OF THE PREFERRED EMBODIMENT

Now, a motor of the permanent-magnet rotor type according to the present invention will be explained with reference to the accompanying drawings.

The following description will be made in connection with a motor adapted to rotate a vane of a small-sized cooling fan which is one embodiment of the present invention.

Figure 1:
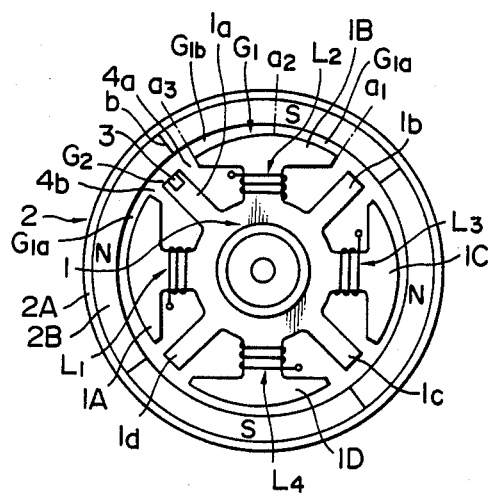
FIG. 1 is a schematic view showing an embodiment of a motor of the permanent-magnet rotor type according to the present invention.
Figure 2:
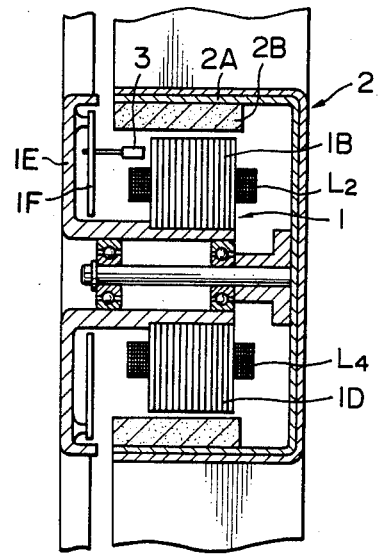
FIG. 2 is a vertical sectional view showing the essential portion of the motor shown in FIG. 1.

A motor of the present invention, as shown in FIGS. 1 and 2, is constructed in a manner such that a rotor 2 is rotated at the outside or outer periphery of a stator 1 having four main poles 1A to 1D formed thereon. In FIG. 1, a fan is eliminated therefrom for clarity in the description. The rotor 2 comprises a rotor body 2A of a cylindrical shape and a plurality of permanent magnets 2B forming a plurality of magnetic poles arranged on the inner periphery of the rotor body 2A. The permanent magnets 2B are magnetized and arranged to allow N poles and S poles to alternately appear thereon in turn. The stator 1 has complementary poles 1a to 1d integrally formed thereon as well as the main poles 1A to 1D.

The main poles 1A to 1D have field windings $L_1$ to $L_4$, respectively, and are arranged in the circumferential direction of the stator 1 in a manner to be spaced at a uniform interval from each other. The complementary poles 1a to 1d are not provided with any winding and are disposed between the respective adjacent two main poles. The field winding $L_1$ of the main pole 1A and the field winding $L_3$ of the main pole 1C are connected with each other, and the field winding $L_2$ of the main pole 1B and the field winding $L_4$ of the main pole 1D are connected with each other. When an exciting current flows through the field windings $L_1$ and $L_3$, the main poles 1A and 1C are magnetized to allow an N pole (or S pole) to appear on the pole face of each of the main poles 1A and 1C. Also, the remaining main poles 1B and 1D connected with the main poles 1A and 1C through the base portions thereof and all the complementary poles 1a to 1d each are magnetized to have an S pole (or N pole). Whereas, when an exciting current flows through the field windings $L_2$ and $L_4$ connected with each other; the main poles 1B and 1D are magnetized to allow an N pole (or S pole) to appear on the pole faces of the main poles, and the main poles 1A and 1C and the complementary poles 1a to 1d are magnetized to allow an S pole (or N pole) to appear on the pole faces thereof.

In addition, a gap defined between the pole face of each main pole and the inner peripheral surface of the permanent magnet 2B of the rotator 2, for example, a gap $G_1$ defined between the pole face of the main pole 1B and the inner peripheral surface of the magnet 2B comprises a uniform gap region $G_{1a}$ of a uniform width or uniform interval formed between the portion $a_1-a_2$ of the pole arc of the main pole and the inner periphery of the magnet 2B, and a non uniform gap region $G_{1b}$ of a non uniform width or non-uniform interval formed between the portion $a_2-a_3$ of the pole arc and the inner peripheral surface of the magnet 2B. In the non-uniform gap region $G_{1b}$ of the gap $G_1$, the diameter or curvature of the pole arc portion $a_2-a_3$ is gradually decreased toward the end $a_3$ of the main pole 1B, so that the width of the non-uniform region $G_{1b}$ is larger than that of the uniform region $G_{1a}$ and is gradually increased toward the end $a_3$. Further, a gap defined between the pole face of each complementary pole and the inner peripheral surface of the magnet 2B of the rotor 2, for example, a gap $G_2$ defined between the pole face of the complementary pole 1a and the inner peripheral surface of the magnet 2B is formed to have a width or interval larger than that of the uniform region $G_{1a}$ of the gap $G_1$ and substantially equal to the maximum width or interval of the non-uniform gap region $G_{1b}$ of the gap $G_1$.

In a motor of such type, it is generally required to detect the stopped position of a rotor by means of a rotator position detector at the stop of the rotator and to flow a current through predetermined field windings according to the detected position. In the present embodiment, this is accomplished by supplying a rotor position signal from a rotator position detector to a current control circuit (not shown) to allow a current to be flowed through predetermined field windings. Reference numeral 3 designates a hall device acting as such rotor position detector which generates a rotor position signal. In this respect, it is well known in the art that a magnetic reluctance detecting device can be used as such a position detector in a small-sized motor as well.

The hall device 3, as shown in FIG. 2, is securely mounted on a support 1F provided on the inner surface of a bottom wall 1E of the stator 1 to be arranged in parallel with the complementary pole $1_a$ and at the central position of the pole surface of the complementary pole $1_a$. The hall device 3 is adapted to generate two signals different from each other depending upon the polarity of the magnet 2B of the rotor 2 opposite thereto. These two signals act to command the current control circuit (not shown) to select field windings to be excited or through which an exciting current is to be flowed.

In the embodiment illustrated, when the hall device 3 detects and N pole of the rotor 2, a current is flowed through the field windings $L_1$ and $L_3$ to magnetize the main poles 1A and 1C in a manner to allow an N pole to appear on the pole faces of the main poles 1A and 1C; whereas, when the S pole of the rotor 2 is detected, a current is flowed through the field windings $L_2$ and $L_4$ to magnetize the main poles 1B and 1D so that an N pole appears on the pole faces thereof.

Now, the manner of operation of the motor according to the present embodiment will be described with reference to FIGS. 1 to 3.

Figure 3A:
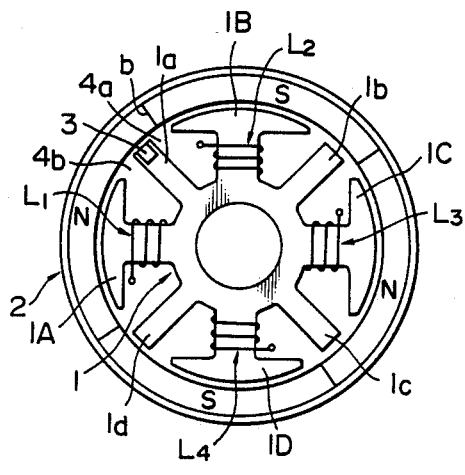
FIGS. 3A and 3B are schematic views for explaining the operation of the motor shown in FIG. 1.
Figure 3B:
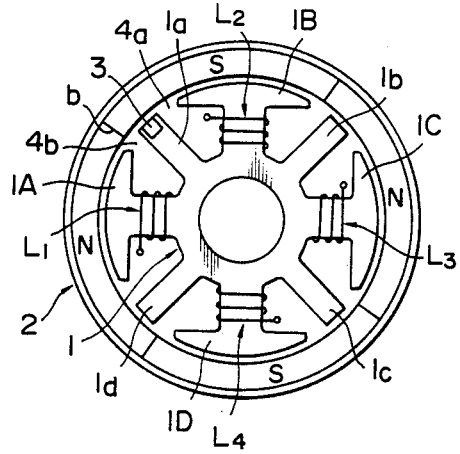

First, in order that the operation of the motor of the embodiment may be readily understood, the description will be made on the assumption that a gap between the pole face of each main pole of the stator 1 and the inner peripheral surface of the permanent magnet 2B and a gap between the pole face of each complementary pole and the inner peripheral surface of the magnet 2B are uniform as shown in FIGS. 3A and 3B. In such a construction, when an exciting current is not flowed through any field windings and the boundary b between the adjacent two permanent magnets 2B in the rotor 2 is positioned opposite to the substantially central portion of an opening 4a or 4b of the stator 1, the magnetic reluctance between the inner peripheral surface of each of the magnets of N and S poles in the rotor 2 and each pole face of the main poles 1A-1D and complementary poles 1a-1d in the stator 1 is minimized and the magnetic reluctances below the magnets are balanced with each other. This results in the rotor 2 being stably stopped at a state that the boundary b is positioned opposite to the substantially central portion of the opening 4a or 4b of the stator 1. In this instance, when the rotor 2 is stopped at such a position as shown in FIG. 3A and the hall device 3 detects an N pole of the rotator 2, a current is flowed through the field windings $L_1$ and $L_3$ to magnetize the main poles 1A and 1C to allow an N pole to appear on the pole faces of these main poles and magnetize the main poles 1B and 1D and complementary poles 1a-1d to allow an S pole to appear on the pole faces thereof. This permits S poles of the complementary poles 1a and 1c opposite to the magnets of an N pole in the rotor 2 to attract an N poles of the rotor 2, resulting in the rotor starting to be rotated in the clockwise direction. At this time, the remaining poles of the rotor 2 and the remaining poles of the stator 1 opposite thereto repel each other to promote rotation of the rotor 2.

When the rotor 2 is rotated at an angle of 90 degrees and the hall device 3 detects S poles of the magnets 2B of the rotor 2, a current is flowed through the field windings $L_2$ and $L_4$; so that the main poles 1B and 1D are magnetized to allow an N pole to appear on the pole faces thereof, and the main poles 1A and 1C and complementary poles 1a-1d are magnetized to permit an S pole to appear on the pole faces thereof. This allows S poles of the complementary poles 1b and 1d to attract N poles of the rotor 2, to thereby satisfactorily continue rotation of the rotor 2.

However, when the power is supplied in order to operate the motor at a state that the rotor 2 is stopped at such a position as shown in FIG. 3B, a current is flowed through the field windings $L_2$ and $L_4$ to magnetize the main poles 1B and 1D to allow the poles to have an N pole and magnetize the main poles 1A and 1C and complementary poles 1a-1d to allow the poles to have an S pole. This causes each magnet of the rotor 2 and the main pole of the stator 1 opposite to the magnet to have polarities different from each other. This results in the attractive force which radially acts on the rotor 2 overcoming the torque of the rotor 2, so that the rotor may not be started.

In view of the foregoing, the motor of the present invention, as described above, is constructed to render the gaps $G_1$ and $G_2$ between the pole faces of the main and complementary poles of the rotator 2 and the inner peripheral surface of each magnet of the rotator 2 non-uniform to thereby prevent the rotor from being stopped at such a position as shown in FIG. 3B of making starting of the rotor 2 impossible or prevent the boundary b between the adjacent two magnets 2B of the rotor 2 from being stopped at a position opposite to or facing the opening 4b defined between the complementary pole and the main pole positioned at the back of the complementary pole along the rotating direction of the rotor, rather than the opening 4a defined between the complementary pole and the main pole positioned in advance of the complementary pole in the rotating direction thereof.

Such formation of the gaps $G_1$ and $G_2$ in the manner described above allows the boundary b between the adjacent two magnets in the rotor 2 to be positioned at the substantially central portion of the opening 4a of the stator as shown in FIG. 1, when a current is not flowed through the field windings $L_1$-$L_4$. This has been experimentally proved by the inventors.

The reason why the boundary b is not stopped at the position opposite to the opening 4b in the present invention will be explained hereinafter. The gap $G_2$ between the inner peripheral surface of the rotor 2 and each of the complementary poles is substantially larger in width than the uniform gap region $G_{1a}$ of the gap $G_1$ between the rotor 2 and each of the main poles, resulting in the magnetic reluctance at the region adjacent to the opening 4b having a large rate of change. This causes the magnetic reluctance to be more unstable to prevent the boundary b from being stopped opposite to the opening 4b.

The stopping of the rotor 2 at such a position allows the rotor 2 to be started in the clockwise direction and continue the smooth rotation as shown in FIG. 3A, when the hall device 3 detects an N pole. When the rotor 2 is stopped at a position displaced at an angle of 90 degrees from the position shown in FIG. 1 and the hall device 3 detects an S pole, a current is flowed through the field windings $L_2$ and $L_4$ to magnetize the main poles 1B and 1D to allow an N pole to appear on the pole faces thereof and magnetize the main poles 1A and 1C and complementary poles 1a-1d to allow S pole to appear on the pole faces thereof. This results in S poles of the complementary poles 1b and 1d opposite to the magnets of N pole in the rotor 2 attracting N poles of the rotor 2, to thereby carry out satisfactory rotation of the rotor in the clockwise direction.

The description has been made with respect to the motor wherein the rotor is rotated in the clockwise direction. However, it is a matter of course that the present invention is readily applicable to a motor having a rotor rotated in the counter-clockwise direction as well. In this instance, a gap between a stator and a rotor is formed in contrast with that of the embodiment described above.

Also, the present invention is applicable to a motor of the inner rotor type that a rotor is rotated on the inside of a stator.

As many apparently widely different embodiments of this invention may be made without departing from the spirit and scope thereof, it is to be understood that the invention is not limited to the specific embodiment thereof except as defined in the appended claims.

What is claimed is:

1. A motor of the permanent-magnet rotor type comprising:

a stator having a plurality of main poles and a plurality of complementary poles integrally formed thereon, said main poles being arranged to be spaced from each other in the circumferential direction of said rotor and each having a field winding provided thereon, said complementary poles being arranged between the respective adjacent two main poles in a manner to be spaced from said main poles;

said plurality of complementary poles being magnetized when an exciting current is flowed through said field windings of said main poles to allow said main poles to be magnetized;

a permanent-magnet rotor having a plurality of magnetic poles annularly arranged opposite to the pole faces of said main and complementary poles, said rotor being arranged concentric with said stator;

said plurality of magnetic poles being combined with each other in turn and magnetized to allow N and S poles to alternately appear thereon in turn; wherein a gap $G_1$ between the pole face of each of said main poles and each of said magnetic poles of said rotor is defined to gradually increase in width; and a gap $G_2$ between the pole face of each of said complementary poles and each of said magnetic poles is defined to have substantially the same width as the maximum width of said gap $G_1$.

2. A motor of the permanent-magnet rotor type as defined in claim 1, wherein said rotor is rotated at the outside of said stator.

3. A motor of the permanent-magnet rotor type as defined in claim 1, wherein said rotor is rotated at the inside of said stator.

4. A motor of the permanent-magnet rotor type as defined in claim 1, wherein said main poles, complementary poles and magnetic poles are the same in number and said number is even.

5. A motor of the permanent-magnet rotor type as defined in claim 4, wherein said main poles are arranged in a manner such that each two main poles arranged opposite to each other at an angle of 180 degrees in the radial direction of said stator form each pair, and the respective pairs of main poles are magnetized in turn.

6. A motor of the permanent-magnet rotor type as defined in claim 1, wherein said gap $G_1$ is formed to gradually increase in width toward the direction opposite to the rotating direction of said rotor.

7. A motor of the permanent-magnet rotor type as defined in claim 1, wherein said gap $G_1$ comprises a uniform gap region of a uniform width and a non-uniform gap region extending from said uniform gap region and having a width gradually increased apart from said uniform gap region.

8. A motor of the permanent-magnet rotor type as defined in claim 1 further comprising a rotational position detector which detects the polarity of each of said magnetic poles of said rotor to generate a signal for commanding a current control circuit to select desired field windings through which an exciting current is to be flowed.

9. A motor of the permanent-magnet rotor type as defined in claim 8, wherein said rotational position detector is adapted to detect the polarity of said magnetic poles of said rotor opposite to any one of said complementary poles.

10. A motor of the permanent-magnet rotor type as defined in claim 9, wherein said rotational position detector comprises a hall device mounted on said stator.

11. A motor of the permanent-magnet rotor type comprising:

a stator having n main poles and n complementary poles (n being an even number) integrally formed thereon, said main poles being arranged in the circumferential direction of said stator so as to be spaced from each other and each having a field winding provided thereon, said complementary poles being arranged between the respective adjacent two main poles in a manner to be spaced from said main poles;

said complementary poles, when an exciting current is flowed through the field windings of one of pairs each consisting of two main poles arranged at an angle of 360 electrical degrees in the radial direction of said stator to allow said pair of main poles to be magnetized, being magnetized by a magnetic flux generated by said field windings of said pair of main poles;

a permanent-magnet rotor having n magnetic poles provided opposite to the pole faces of said main and complementary poles, said rotor being arranged concentric with said stator;

said plurality of magnetic poles being combined with each other in turn in a manner to allow N poles and S poles to alternately appear thereon in turn;

a gap $G_1$ defined between the pole face of each of said main poles and each of said magnetic poles of said rotor comprises a uniform gap region of a uniform width and a non-uniform gap region extending from said uniform gap region and having a width gradually increased from that of said uniform gap region; and a gap $G_2$ defined between the pole surface of each of said complementary poles and each of said magnetic poles is formed to have a uniform width which is substantially the same as the maximum width of said non-uniform gap region of said gap $G_1$.

12. A motor of the permanent-magnet rotor type as defined in claim 1, wherein said rotor is of the commutatorless and brushless type.

* * * * *

UNITED STATES PATENT AND TRADEMARK OFFICE
CERTIFICATE OF CORRECTION

PATENT NO. : 4,549,104
DATED : October 22, 1985
INVENTOR(S) : Yoshihisa Niimura et al.

It is certified that error appears in the above-identified patent and that said Letters Patent are hereby corrected as shown below:

Column 2, line 18, "proivde" should be --provide--
Column 2, line 19, "rotator" should be --rotor--
Column 2, line 57, "rotator" should be --rotor--
Column 4, line 27, first and second occurrences, "rotator" should be --rotor--
Column 6, line 35, after "allow" insert --an--

Signed and Sealed this

Ninth Day of September 1986

[SEAL]

Attest:

DONALD J. QUIGG

Attesting Officer

Commissioner of Patents and Trademarks